July 10, 1962      J. E. TRACEY ETAL      3,043,165
METHOD OF MAKING A CUTTING DIE ASSEMBLY
Filed July 29, 1957                    2 Sheets-Sheet 1
FIG. 1.
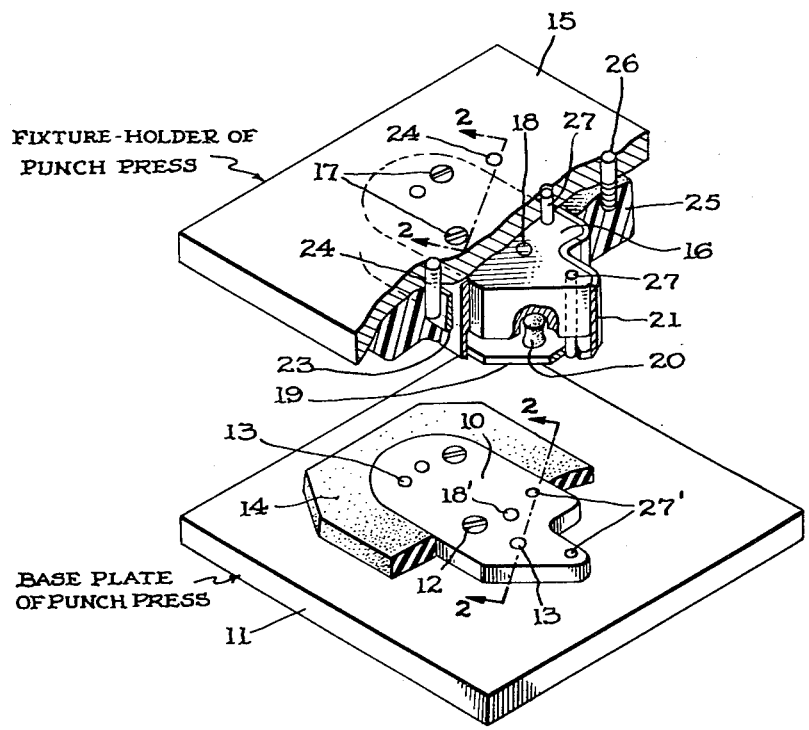
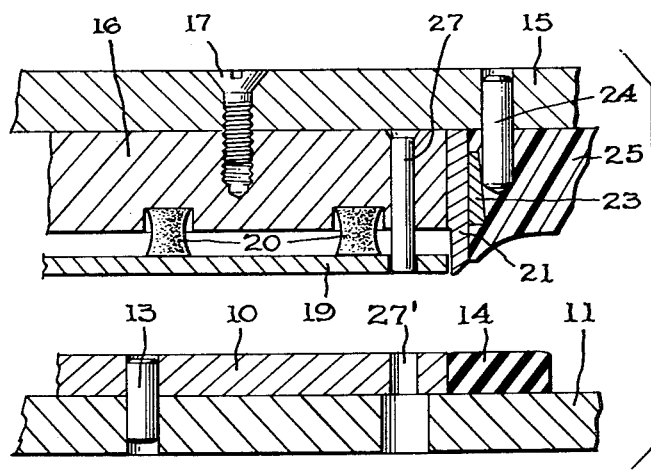
INVENTORS
JOHN E. TRACEY
ELWOOD L. WHEELER
BY
ATTORNEY July 10, 1962  J. E. TRACEY ETAL  3,043,165
METHOD OF MAKING A CUTTING DIE ASSEMBLY
Filed July 29, 1957  2 Sheets-Sheet 2

INVENTORS
JOHN E. TRACEY
ELWOOD L. WHEELER.
BY K.G.Doub
ATTORNEY

# United States Patent Office 3,043,165
Patented July 10, 1962

3,043,165
METHOD OF MAKING A CUTTING DIE ASSEMBLY
John E. Tracey, Reisterstown, and Elwood L. Wheeler, Owings Mills, Md., assignors to The Bendix Corporation, a corporation of Delaware
Filed July 29, 1957, Ser. No. 674,927
3 Claims. (Cl. 76—107)

This invention relates to cutting die assemblies for cutting or stamping shapes out of sheet material parts; it is particularly concerned with an improved process of making dies from composite slab stock wherein the punch plate or block, the stripping plate and the cutting blade holder or die block are originally profiled while in "sandwich" form and are thereafter separated and assembled to their coacting components and attached to the upper and lower fixture-holders of a punch press or the like for performing their respective functions.

An object of the invention is to provide a process or method of making a cutting die assembly from composite slab stock whereby the essential die components may be made to exact specified dimensions and die clearances with a minimum of skilled labor and consequently at such a low cost as to render feasible the use of dies for stamping or cutting out relatively small production lots.

Another object is to provide a process or method of making a cutting die assembly in which the principal cutting and machining operations may be made on external surfaces where measurements can be well controlled and extremely fine grinding and finishing operations can be readily employed.

Another object is to provide a process of making and assembling cutting die components in which the punch plate or block, the stripping plate and cutting blade holder or die block may be cut from suitable composite slab stock and thereafter machined to exact dimensions and die clearances prior to assembly, thereby avoiding the tedious and time-consuming operations involved in trial and error methods.

The foregoing and other objects and advantages will become apparent in view of the following description taken in conjunction with the drawings wherein:

FIG. 1 is a perspective view of a cutting die assembly in accordance with the invention, with the parts shown assembled to the base plate or bed frame and upper fixture mounting plate of a conventional punch press;

FIG. 2 is an enlarged fragmentary section taken substantially on the lines 2—2, FIG. 1;

Figure 5:
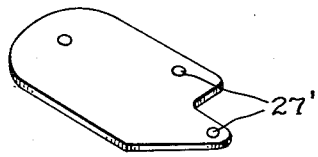
FIG. 5 is a perspective view of the shape which is cut from a sheet material blank by the dies of the assembly in the example shown.

Referring to the drawings in detail, and first to FIG. 1, the lower die fixture or assembly comprises a punch plate or block 10, which is firmly secured to a base plate 11 by means of screws 12 and dowel pins 13, the latter being used to ensure that the block remains properly located. The block 10 is made of hardened material such as tool steel, and it obviously has the exact shape of the article to be made as shown in FIG. 5. A rubber stripper pad 14 encircles the block 10 and may be secured to the base plate 11 by any commercial adhesive capable of affixing rubber to the material of which the base plate is made and which in practice is metal.

The upper die fixture or assembly, which may be carried by the upper backing or mounting plate 15 of a punch press, comprises a blade-holder block 16 (of the same shape as the punch plate 10 and formed simultaneously therewith in a manner to be described), which is secured to the plate 15 by means of screws 17; it is provided with one or more alignment holes 18 which coact with similar holes 18' in the punch plate 10, these holes functioning as a convenient means for checking alignment whenever found necessary or desirable. A stripper plate 19 is connected to the block 16 by a simple yet novel and highly effective means, comprising a series of resilient plugs 20, note FIG. 2, which have an hourglass shape for a purpose to be described. Each of these plugs is cemented at its opposite ends, respectively, to the adjacent surfaces of the blade-holder block 16 and stripper plate 19.

Figure 4:
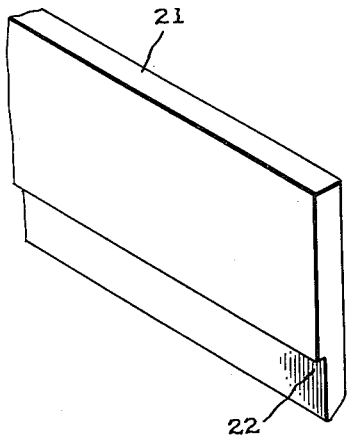
FIG. 4 is a fragmentary perspective view of one of the cutting blades which make up the die assembly, illustrating how the blade is relieved at its cutting edge to provide the necessary die clearance during the cutting operation.

A cutting blade 21, usually of tool steel, encircles the block 16 and has its lower effective cutting edge projected downwardly therebelow around the stripper plate 19, the lower edge of the said blade being relieved as indicated at 22 in FIG. 4 for a purpose to be explained. This blade is carefully machined when it is in straight or rule form and then bent to the shape of the block 16 and is initially staked in place by means of wedges 23 and back-up pins 24. An anchoring pad 25, preferably comprised of a metal-bearing plastic, as will be more fully hereinafter described, is placed around the cutting blades and wedges 23 and back-up pins 24 while in its plastic state and then permitted to set. Auxiliary anchoring means are provided in the form of screws 26.

The member indicated at 27 in FIGS. 1 and 2 is a piercing punch, any number of which may be provided in accordance with the number of holes to be made in the stamping. When the upper fixture descends these punches pass through the stamping and are received in holes 27' formed in the punch plate or block 10.

The operation of cutting dies of this general type is well known. Briefly, the base plate 11 and mounting plate 15 are affixed to the upper fixture-supporting shoe and lower bed frame, respectively (or in the reverse order as conditions warrant), of a punch press, and the sheet metal or other sheet material from which the part of FIG. 5 is to be cut is fed between the upper and lower die assemblies as the upper die assembly is lowered and raised to cut out the shape. As the blade 21 penetrates through the material from which the part is made, the stripper plate 19 moves back or upwardly against the resistance of the resilient stripper plugs 20. Due to the particular hourglass shape of the plugs, as they compress, the intermediate portions thereof will expand and assume a more nearly cylindrical shape as they fill out the cylindrical recesses in which they are mounted. As a result, any tendency toward lateral stresses at their top and bottom cemented surfaces is minimized, nor will the body portions of the plugs expand radially outwardly into the path of, or against, any adjacent punches 27 and cause misalignment of the latter. These resilient stripper plugs contribute to the economy of the assembly in that they not only serve as stripper or kick-off springs, but also as a means of attaching the stripper plate 19 to the blade-holder 16.

The relieved lower cutting edge portion 22 of the blade 21 also contributes to the economy as well as the effectiveness of the die assembly and the process of making same as will be more fully described in connection with the description of the process. However, at this point it may be stated that this recess is of such dimension as to give the necessary clearance between the peripheral edge of the punch plate 10 and the blade when the latter descends to cut out the sheet metal stamping; and this clearance is determined by the thickness or gauge of the sheet metal or material from which the stamping is made, as will be well understood by those having a knowledge of the art. As will be hereinafter more fully described, by relieving the cutting blade, the punch plate 10 may be originally profiled to the dimensions of the part to be made, less die clearance, and necessary final clearance being provided by the recessed or relieved portion 22 of the blade 21.

The process of making the improved cutting die assembly will now be described.

Figure 3:
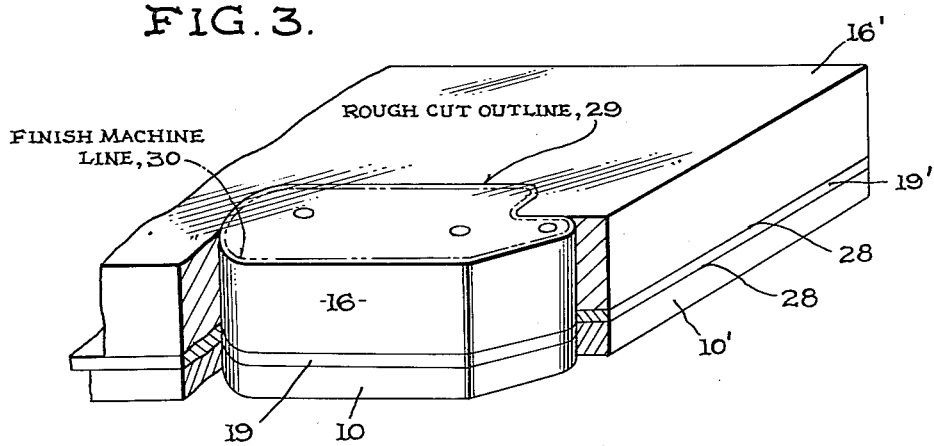
FIG. 3 is a fragmentary perspective view of a composite metal block showing how the cutting blade holder, the stripper plate and the punch plate or block are initially rough-cut therefrom as a single composite unit.

Referring to FIG. 3, the basic contour of the punch plate 10, stripper plate 19 and blade-holder block 16 is obtained by first making a layout drawing, or a prototype, having the dimensions and shape of the part to be made, an example of which is shown in FIG. 5, the exact dimensions being modified sufficiently to obtain the necessary die clearances. The slabs or plate stock indicated at 16', 19' and 10' in FIG. 3, in practice are comprised of metallic plate stock having their parallel surfaces ground or dressed to obtain the exact thickness of each piece to be cut therefrom. For example, the plate stock 16' for the blade-holder block may be made of the cheapest material that will do the work; in practice, rough-ground cold-rolled steel has proved satisfactory. The plate stock 19', from which the stripper plate is made, may also be made of rough-ground cold-rolled steel. The plate stock 10', from which the punch plate 10 is made, is of tool steel, although it could be made of cold-rolled steel. Ordinarily it is preferred to use heat-treatable steel for this latter member.

The mating surfaces of these slabs are then provided with a coating of commercial solder as indicated at 28. The plates are then fluxed and heated so that the solder is brought to a molten state, whereupon pressure is applied to bring the plates into intimate contact, and the composite or "sandwich" block allowed to cool. Using the drawing or prototype as a guide, the shape to be produced is laid out on the slab and sawed or otherwise severed from the main block on a rough-cut profile line, indicated at 29. Holes may be drilled either at this time or when final machining to size, to accommodate the necessary punches 27 and provide the aligning holes 18, 18'.

After the composite block has been severed on a rough-cut line, it is then machined to the exact size required to obtain the desired shape subject to allowance for the required die clearances. This is illustrated by the finish machine line indicated at 30 in FIG. 3. It will be obvious that the final machining operations are greatly simplified due to the fact that all machine work is carried on from the exterior of the composite block.

After having been machined to size, the composite block is then heated to melt the solder bond and permit the three separate pieces, which now constitute the finished cutting blade holder block 16, the stripper plate 19 and the punch plate 10, to be separated. The only remaining operation necessary to place these pieces into a finished state ready for assembly are to provide the stripper mounting holes for the plugs 20 and any other holes or openings which cannot be made when the blocks are in composite form, and then heat-treat the separated parts or members, if required.

Since the clearance space or gap between the cutting edge of blade 21 and the edge of the plate or block 10 is provided by relieving the blade as at 22, in FIG. 4, the peripheral edge of the punch plate 10 will require no separate turning or machining operations to provide this clearance, which is usually approximately equal to 5 or 6% of the thickness of the material to be cut and should be uniformly distributed around all surfaces of the punch plate. Another important advantage is that the punch plate 10, the stripper plate 19 and the blade-holder block 16 may have the same diametrical dimensions, which means that practically all machine work may be done while these members are in composite form. Preferably the relief or recess 22 is machined throughout the entire length of the blade 21 while the latter is in a flat state, or before it is bent to the shape of the block 16. When the cutting blade 21 is bent and formed to the contour of the block 16, the clearance space remains true and uniform due to the fact that the inner surface of the blade which contacts the block 16 and the inner surface of the recess 22 are also uniform and parallel throughout the entire length of the blade. Prior to bending the blade to the shape of the block, the latter may be connected to the upper fixture plate 15 by the screws 17.

After the blade has been thus recessed and bent around the block 16, it is fitted and heat-treated to the proper temperature and then staked in place by means of the wedges 23 and back-up pins 24. A commercial metal-bearing plastic material, preferably capable of adhering to the upper fixture plate 15 which in this case is metal, is mixed to the consistency of putty and then packed tightly around the cutting blade sections and wedges 23 and back-up pins 24 and allowed to set or harden. This is the pad 25 heretofore noted. In practice, a plastic composition sold under the trade name "Devcon" has proved satisfactory for this purpose. The set screws 26 will securely key the plastic material in place. This method of securing the blade 21 in place serves to reinforce any weakness in the blade; also any stresses tending to urge the blade away from the block 16 and thereby increase the clearance afforded by the recess 22 will be transferred to the anchoring pad 25.

The stripper plate 19 may now be installed, and this is done by means of the plugs 20, as heretofore described, and which in practice are made of rubber of suitable flexibility. The stripper buttons 20 are of such number and so located as to provide the required stripping pressure or "give" uniformly over the stripper plate. In practice, the diameter of the holes in which the buttons are mounted are approximately $\frac{1}{32}$ of an inch larger than the diameters of the stripper buttons received therein; the said holes being drilled flat to a depth such as will give proper loading for the rubber or other resilient material selected. A convenient method of making these rubber slugs or buttons is to take a flat sheet of rubber of the required thickness and cut out the shape of the slugs with a hollow commercial hole punch. The natural result of this method of cutting produces a button having the desired hourglass shape in cross section. It is only necessary thereafter to apply a good grade of commercial cement to the top and bottom surfaces of the buttons and hold the parts together under pressure until the cement has set.

The punch plate 10 is attached to the lower bed or frame plate 11 in the manner heretofore described, namely by the screws 12 and dowel pins 13. The stripper pad 14 may be made of a good grade of rubber of the required thickness and cemented to the plate 11.

Actual experience has demonstrated that a die assembly constructed in the manner herein described is rugged and dependable and will cut out shapes with a high degree of accuracy over relatively long periods of use without requiring any change in the cutter blade or dressing of parts to correct clearance deviations. The process lends itself to standard machine practice from the relatively rough sawing operation to the very precise grinding operations. All machining is done to actual specified dimensions on external surfaces with the knowledge beforehand that die clearance will be of the correct value.

It will be understood that certain limited variations in the arrangement and construction of parts, the material used and the order of the steps of the method will be apparent to those skilled in the art once the gist of the invention has become known.

What is claimed is:

1. In the art of fabricating a cutting die assembly utilizing a single cutting edge, a cutting blade fitted to the exterior contour of a holding block, a stripper plate resiliently mounted to said block within the confines of the blade and a punch plate which cooperates with said blade to shear the part to be produced, the method which consists in providing three flat slabs of material from which the said block and plates are to be made, at least the holding block slab and the punch plate slab being of metallic material, said slabs having mating surfaces, stacking said slabs to provide a composite slab and joining the slabs at their mating surfaces, laying out the profile of the article to be made on a surface of the composite slab, severing the laid-off area from the remainder of the composite slab on a rough out line, finish machining or dressing the now exteriorly accessible profile surface of the rough cut composite section to the final dimensions of the said block and plates, separating the finished holding block, stripper plate, and punch plate, relieving the cutting edge of the blade while the latter is in its flat state to provide the desired die clearance, securing the holding block to a backing plate and disposing the cutting blade around said block with its relieved edge facing inwardly, fastening a plurality of dowel pins to said backing plate in close proximity to the outside edge of said cutting blade and inserting a plurality of wedges between said dowels and said cutting blade to hold said blade tightly against said holding block, packing a plastic material around said cutting blade, wedges and dowel pins and permitting said material to harden, assembling the stripper plate to the holding block by means of resilient members, and assembling the punch plate to an oppositely disposed base plate for shearing cooperation with said cutting blade.

2. The method as claimed in claim 1 wherein said holding block, stripper plate, and punch plate are simultaneously drilled while held in the composite slab arrangement to assure perfect alignment of holes, and punch members are inserted in the holes thus formed in the holding block in axial alignment with the holes in the stripper plate and the punch plate.

3. The method as claimed in claim 1 wherein said cutting blade is heat treated after it is formed around the holding block.

References Cited in the file of this patent
UNITED STATES PATENTS

| | | |
|---|---|---|
| 922,926 | Lynch | May 26, 1909 |
| 1,095,116 | Kaven | Apr. 28, 1914 |
| 1,670,898 | Messmer | May 22, 1928 |
| 1,843,753 | De Witt et al. | Feb. 2, 1932 |
| 2,276,376 | Deubel | Mar. 17, 1942 |
| 2,643,715 | McClellan | June 30, 1953 |
| 2,821,871 | Sarno | Feb. 4, 1958 |

FOREIGN PATENTS

| | | |
|---|---|---|
| 295,467 | Great Britain | Aug. 16, 1928 |